United States Patent [19]

Moriga et al.

[11] Patent Number: 5,441,994
[45] Date of Patent: Aug. 15, 1995

[54] PLASTISOL COMPOSITION

[75] Inventors: Toshinori Moriga, Tokyo; Shunji Kojima, Yokosuka; Seishichi Kobayashi, Yokohama, all of Japan

[73] Assignee: Toyo Seikan Kaisha, Ltd., Tokyo, Japan

[21] Appl. No.: 242,843

[22] Filed: May 16, 1994

[30] Foreign Application Priority Data

May 14, 1993 [JP] Japan .................................. 5-112901
May 14, 1993 [JP] Japan .................................. 5-112902

[51] Int. Cl.$^6$ .......................... C08K 5/12; C08K 5/11; C08K 5/521
[52] U.S. Cl. ..................... 523/201; 524/143; 524/296; 524/297; 524/313; 524/314; 524/317; 525/902
[58] Field of Search .......................... 523/201; 525/902; 524/310, 317, 314, 296, 297, 143

[56] References Cited

U.S. PATENT DOCUMENTS 5,298,542  3/1994  Nakamura et al. .................. 523/201

FOREIGN PATENT DOCUMENTS

| 0265371 | 4/1988 | European Pat. Off. |
| 0544201 | 6/1993 | European Pat. Off. |
| 0557944 | 9/1993 | European Pat. Off. |
| 1598579 | 9/1981 | United Kingdom |
| 0007906 | 5/1992 | WIPO |
| WO92079-06A1 | 5/1992 | WIPO |

OTHER PUBLICATIONS

Research Disclosure, Dec. 1992, RD 344038, ICI Resins Research and Technology Department.

*Primary Examiner*—Peter A. Szekely
*Attorney, Agent, or Firm*—Sughrue, Mion, Zinn, Macpeak & Seas

[57] ABSTRACT

An acrylic resin plastisol composition that forms coatings or molded articles having excellent anticreep property. The plastisol composition maintains excellent fluidity required for the coating and molding even after preserved for extended periods of time and further exhibits excellent gelation property upon heating, enabling the obtained coating or the molded article to exhibit excellent resistance against the relaxation of stress. The plastisol composition comprises a dispersing medium composed chiefly of a plasticizer and acrylic resin grains dispersed in said dispersing medium, wherein said acrylic resin grains have a functional group selected from the group consisting of carboxyl group, hydroxyl group, epoxy group, methylol group and etherified methylol group, and said dispersing medium contains a crosslinking agent that has reactivity to said functional group in a state of being at least partly solubilized in said dispersing medium.

9 Claims, 3 Drawing Sheets

A

B

C

D

PLASTISOL COMPOSITION

BACKGROUND OF THE INVENTION

1. Field of the Invention

The present invention relates to a plastisol composition that forms coatings or molded articles having excellent anticreep property. More specifically, the invention relates to a plastisol composition of an acrylic resin which maintains excellent fluidity required for the coating and molding even after preserved for extended periods of time and further exhibits excellent gelation property upon heating, enabling the obtained coating or the molded article to exhibit excellent resistance against the relaxation of stress.

2. Description of the Prior Art

Plastisol compositions have been widely used for forming gaskets and liners for hermetically sealing container closures and the like for the reasons that they have excellent fluidity, they do not contain volatile components such as solvents, they are gelled upon heating to form molded articles of any shapes and that they have suitable degrees of softness and cushioning property.

The plastisol is obtained by using a liquid plasticizer as a dispersing agent and dispersing therein resin grains of emulsion sizes or suspension sizes. Though the dispersed state is maintained at room temperature, the resin grains absorb the plasticizer at high temperatures and are merged and are plasticized. Homopolymers and copolymers of a vinyl chloride have heretofore been widely used as resins emitting, however, hydrogen chloride into the open air and further emitting harmful substances such as dioxines when they are incinerated. Therefore, there has already been proposed to use a plastisol of an acrylic resin.

For instance, Japanese Patent Publication No. 26263/1981 discloses a thermally merging acrylic resin plastisol which contains grains of a single-phase acrylic polymer or copolymer containing at least 60% by weight of alkyl acrylate or methacrylate units but without containing a surfactant, said polymer or said copolymer being non-volatile at room temperature and is dispersed in a medium that has the same chemical structure as the monomer of said polymer or said copolymer but that does not contain the surfactant, and said polymer or said copolymer containing a compatible liquid plasticizer which is not a monomer.

There has further been known a reactive plastisol of a non-vinyl chloride resin. For instance, Japanese Patent Publication No. 12772/1989 discloses a reactive plastisol which is insoluble in a plasticizer at room temperature and is plasticized at high temperatures, comprising a polyvinyl acetal resin, an epoxy resin, or a combination thereof with a polyester plasticizer, and a curing agent of an epoxy resin.

Furthermore, Japanese Laid-Open Patent Publication No. 161849/1987 discloses a reactive plastisol comprising a polyether or a polyester plasticizer modified with a polymethacrylate resin or an isocyanate, and a thermal reaction starter and an optical reaction starter.

However, the known acrylic plastisol proposed above has pot life which is inferior to that of a plastisol composition of a vinyl chloride resin, loses fluidity while it is being preserved, and fails to exhibit gelation property to a sufficient degree after preserved. Moreover, the coating or the molded product obtained by gelling the acrylic plastisol upon heating exhibits insufficient anticreep property particularly when it is heated.

The containers and container closures are provided with a gasket or a lining composed of a plastisol to accomplish the sealing. However, the gaskets and linings composed of the acrylic resin plastisol exhibit anticreep property that is very inferior to that of the gaskets or linings composed of a vinyl chloride resin plastisol, and develop such troubles as creeping and breakage due to the heat at the time of hot-filling and retort-sterilization, permitting the content to leak.

SUMMARY OF THE INVENTION

The object of the present invention, therefore, is to provide a plastisol composition of an acrylic resin which maintains excellent fluidity required for the coating and molding even after preserved for extended periods of time and further exhibits excellent gelation property upon heating, enabling the obtained coating or the molded article to exhibit markedly improved anticreep property.

According to the present invention, there is provided an acrylic plastisol composition having excellent anticreep property comprising a dispersing medium composed chiefly of a plasticizer and acrylic resin grains dispersed in said dispersing medium, wherein said acrylic resin grains have a functional group selected from the group consisting of carboxyl group, hydroxyl group, epoxy group, methylol group and etherified methylol group, and said dispersing medium contains a crosslinking agent that has reactivity to said functional group in a state of being at least partly solubilized in said dispersing medium.

According to the present invention, the acrylic resin grains should contain the functional groups at a concentration of 7 to 330 millimoles per 100 g of the grains thereof. Most desirably, furthermore, the acrylic resin grains should comprise a core of a resin component composed chiefly of a (meth)acrylic ester unit and a shell of an acrylic resin component having a functional group-containing monomer unit. It is desired that the acrylic resin grains have 10 to 60% by weight of a THF-insoluble moiety.

The crosslinking agent should be soluble at least partly in the plasticizer or should desirably be mostly soluble therein and should have reactivity to the functional group in the acrylic resin. Preferred examples of the crosslinking agent include a liquid epoxy compound, a modified or unmodified polyamine, a modified or unmodified polyamideamine, and a methylolated or an ether methylolated amino resin.

The chief plasticizer component which is contained in an amount of 60% or more in the plasticizer should have a molecular weight of 220 to 420 and a solubility parameter (SP value) of 7.9 to 10.0 from the standpoint of obtaining excellent pot life, gelation property and mechanical property.

DETAILED DESCRIPTION OF THE PREFERRED EMBODIMENTS

According to the present invention, the acrylic resin grains having a functional group selected from the group consisting of carboxyl group, hydroxyl group, epoxy group, methylol group and etherified methylol group are dispersed in a dispersing medium which is chiefly composed of a plasticizer, and use is made, as a dispersing medium, of a plasticizer which contains a crosslinking agent having reactivity to the above functional group in a state of being at least partly solubilized in the dispersing medium.

The above-mentioned functional group existing in the acrylic resin prevents the acrylic resin and the plasticizer from becoming compatible to each other when the composition is preserved at room temperature so that the pot life is lengthened, prevents the acrylic resin from being dissolved in the plasticizer so that the fluidity thereof is enhanced and that the workability is enhanced when it is applied or a molded article thereof is formed, and reacts with the crosslinking agent in the dispersing medium during the gelation by heating to form a mesh-like crosslinked structure in the resin coating or in the molded article so that greatly improved anticreep property is exhibited.

Figure 1:
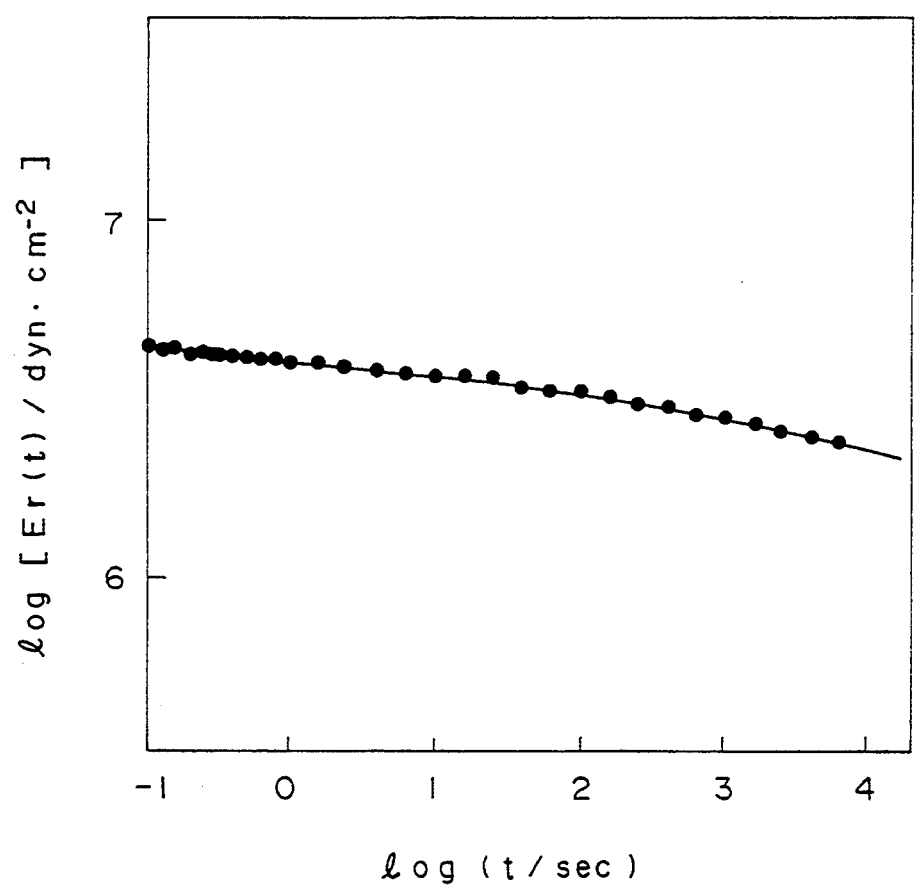
FIG. 1 is a graph showing the measured results of relaxation of stress according to Example 1, and in which a modulus of relaxation elasticity $r(t)(dyns/cm^2)$ is plotted with respect to the time t (sec)
Figure 2:
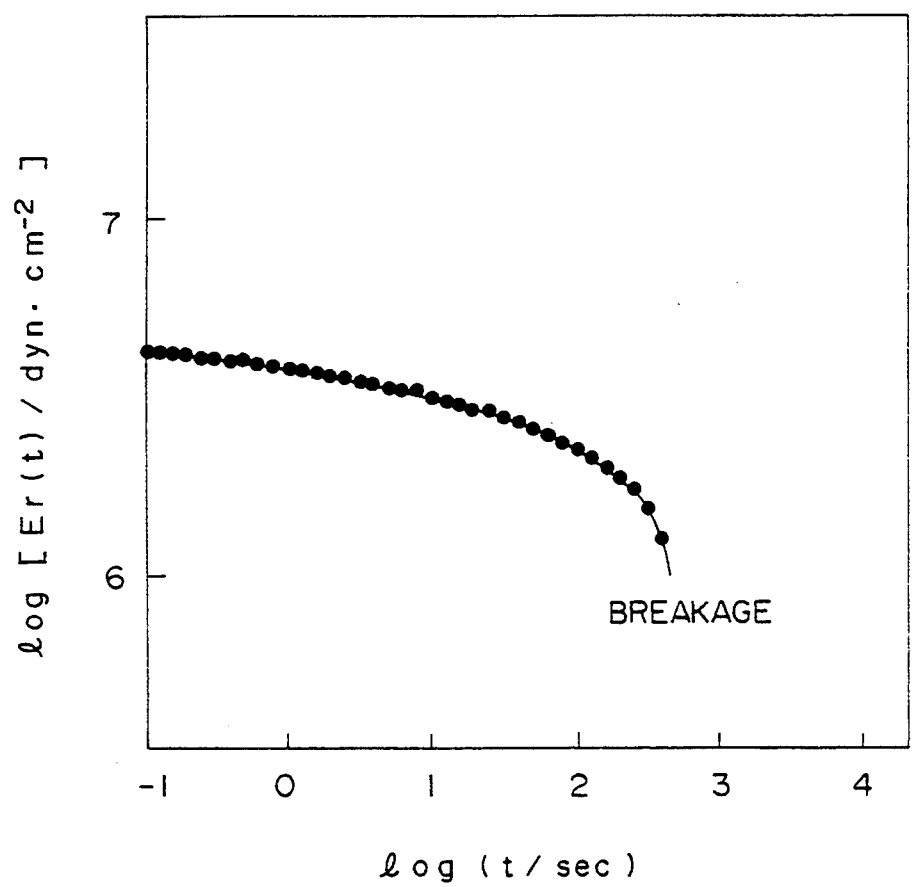
FIG. 2 is a graph showing the measured results of relaxation of stress according to Comparative Example 1, and in which a modulus of relaxation elasticity $r(t)(dyns/cm^2)$ is plotted with respect to the time t (sec)

Reference should be made to Example 1, Comparative Example 1 and graphs (FIGS. 1 and 2) showing relations between the passage of time and the rate of relaxation of the gelled acrylic resin at each of the temperatures. When the acrylic resin as a whole is a homopolymer of a (meth)acrylic ester, the pot life lasts for as short as about two days. When a shell of a resin that incudes a polar group-containing monomer unit (acrylic acid) is formed on the surface of the core of the resin of the (meth)acrylic ester unit, on the other hand, the pot life is extended to 20 days or longer and, particularly, to 28 days or longer. When the acrylic resin of the above homopolymer is used (Comparative Example 1) or when a granular copolymer resin having the above-mentioned core-shell structure is used without, however, adding the crosslinking agent to the dispersing medium (Comparative Example 2), the rate of relaxation of stress abruptly increases when a certain limit time is exceeded. At a temperature of 120° C., the relaxation of stress takes place within 5 minutes resulting in a breakage within 10 minutes. When use is made of a combination of the acrylic resin grains into which a functional group is introduced and a plasticizer that contains a crosslinking agent in accordance with the present invention, on the other hand, a relaxation time of stress of 40 minutes or longer is exhibited at the same temperature.

The reason why the liners made of a vinyl chloride resin plastisol exhibit excellent anticreep property and the liners made of an acrylic resin plastisol exhibit poor anticreep property is attributed to that in the former case, the noncrystalline moiety dissolved in the plasticizer during the gelation and the crystalline moiety that does not dissolve in the plasticizer exist forming a mesh-like structure to exhibit rubbery elasticity and anticreep property whereas in the case of the acrylic resin, most of the portions remain compatible in a noncrystalline form in the plasticizer without forming the mesh-like structure. In the acrylic resin plastisol of the present invention, on the other hand, the functional group in the acrylic resin reacts with the crosslinking agent in the dispersing medium during the gelation to form a mesh-like structure which prevents stress from relaxing.

According to the present invention, further increased advantage is accomplished when the acrylic resin grains that are dispersed in the dispersing medium of a plasticizer and a crosslinking agent, comprise a core of a resin composed chiefly of a (meth)acrylic ester unit and a shell of an acrylic resin having a functional group selected from the group consisting of carboxyl group, hydroxyl group, epoxy group, methylol group and etherified methylol group.

That is, the grains of this structure in which functional groups (polar groups) in the resin are concentrated on the surfaces, have a very high ability for preventing the acrylic resin and the plasticizer from becoming compatible with each other when the composition is preserved at room temperature. On the other hand, the (meth)acrylic ester that forms the core becomes compatible with the plasticizer upon heating and imparts favorable gelation property. During the gelation, furthermore, the functional groups on the surfaces of the resin grains quickly and effectively react with the crosslinking agent in the dispersing medium to form a crosslinked structure which helps effectively develop anticreep property and rubbery elasticity.

The acrylic resin grains used in the present invention are derived from not less than 50% by weight of an acrylate or a methacrylate monomer that gives a polymer having a glass transition point (Tg) of 70° C. or higher when it is homopolymerized, contributing to improving the anticreep property upon heating. The present invention provides a sealant that withstands hot-filling and retort-sterilization by using the resin grains derived from a composition which is composed chiefly of the above-mentioned particular acrylate or methacrylate monomer and includes an epoxy group-containing ethylenically unsaturated monomer.

In the case of a plastisol which contains an epoxy resin component in the resin grains, it has been known that the viscosity rises during the preservation and the so-called pot life is shortened. According to the present invention, it was found that the viscosity is exceptionally stabilized and the pot life is markedly improved when use is made of an epoxy group-containing acrylic resin and a plasticizer of citric ester and/or a glycol ester. This is a phenomenon specific to the plasticizer of the citric ester and/or the glycol ester only. Viscosity stability that is practically useful is obtained from none of other plasticizers.

According to the present invention, it is desired that the acrylic resin grains have 10 to 60% by weight of a THF (tetrahydrofurane)-insoluble moiety. That is, with the resin grains having a gel component, crosslinking of the grain boundaries is finished within short periods of time to exhibit excellent anticreep property.

When the amount of the THF-insoluble moiety is smaller than the above-mentioned range, it becomes difficult to crosslink the grain boundaries within short periods of time and when the amount thereof is greater than the above-mentioned range, it becomes difficult to crosslink the grain boundaries. In either case, therefore, excellent anticreep property is not obtained.

According to the present invention which uses the above-mentioned composition and a particular foaming agent, i.e., an azodicarbonamide and/or a p,p'-oxybis(-benzenesulfonyl hydrazide) in combination, it is made possible to provide an acrylic resin composition for foamed cap-sealing which is foamed yet exhibiting very improved resistance against the relaxation of stress or anticreep property and pressure-resistant sealing property.

Figure 3:
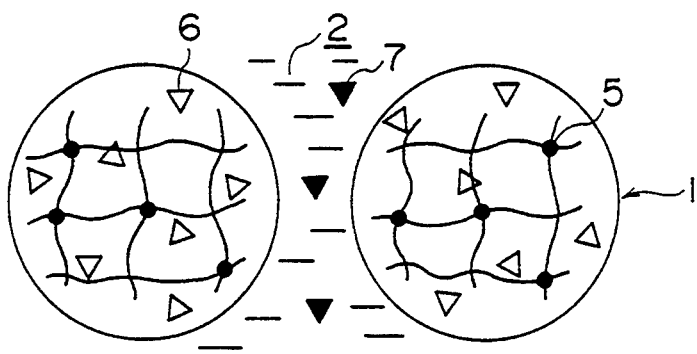
FIG. 3 is a diagram for schematically illustrating the dispersed structure of a plastisol of the present invention.
Figure 3:
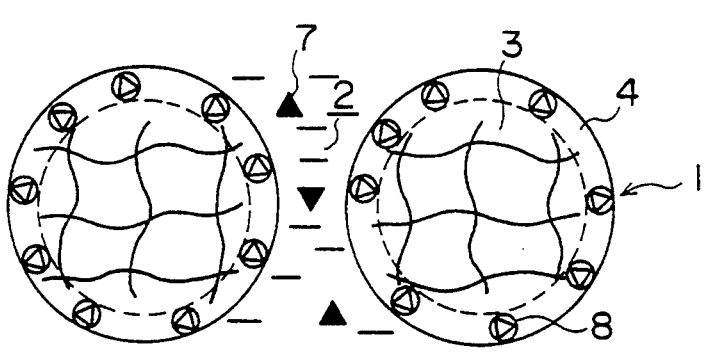
Figure 3:
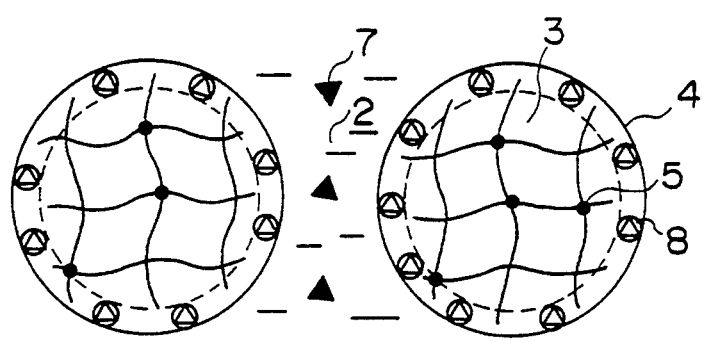
Figure 3:
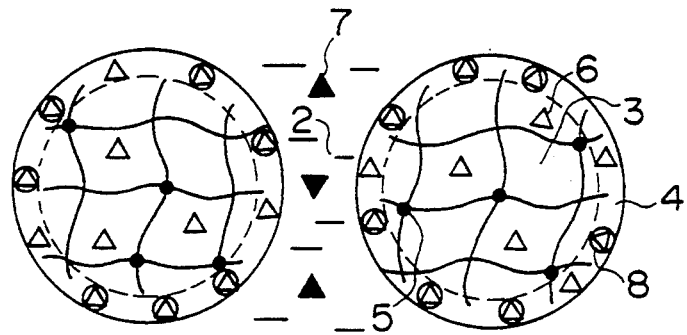

Referring to FIG. 3 which schematically illustrates the dispersion structure of the plastisol of the present invention, the plastisol comprises a dispersion medium 2 and acrylic resin grains 1 dispersed therein. The dispersion medium 2 comprises a plasticizer and a crosslinking agent that is dispersed therein at least part of which being dissolved. Referring to FIG. 3A illustrating a preferred example of the acrylic resin grains, the acrylic polymer chains are bonded together via crosslinking points 5 such that the THF-insoluble moiety becomes 10 to 60% by weight. The resin grains include a functional group 6 such as an epoxy-group which, upon heating, reacts with the crosslinking agent 7 contained in the dispersion medium. Crosslinking points are introduced into the acrylic polymer chains by the reaction among the epoxy groups or by the introduction of polyfunctionality such as of divinyl benzene or the like.

Referring to FIG. 3B which illustrates another example of the resin grains, the resin grains comprise a high molecular core 3 composed chiefly of a (meth)acrylic ester unit and a shell 4 of a resin having a polar group 8 such as a carboxyl group.

Referring to FIG. 3C which illustrates a further example of the resin grains, the core 3 of the polymer composed chiefly of the (meth)acrylic ester unit is crosslinked and has on the surface thereof the shell 4 of a resin having a carboxyl group.

Referring to FIG. 3D which illustrates a still further example of the resin grains, the polymer chains are crosslinked in the core 3, functional groups such as epoxy groups exist even inside thereof, and the core 3 has a shell 4 of a resin that has an epoxy group or a carboxyl group.

The crosslinking points are introduced during the production, i.e., during the polymerization of the acrylic resin, and the core-shell structure is formed during the polymerization or through a step different from the polymerization.

Acrylic Resin

Examples of the ester of an acrylic acid or a methacrylic acid that is a main component of the acrylic resin include methyl (meth)acrylate, ethyl (meth)acrylate, isopropyl (meth)acrylate, n-butyl (meth)acrylate, isobutyl (meth)acrylate, n-amyl (meth)acrylate, isoamyl (meth)acrylate, n-hexyl (meth)acrylate, 2-ethyl hexyl (meth)acrylate-and n-octyl (meth)acrylate. Here, the (meth)acrylic acid stands for an acrylic acid or a methacrylic acid. The (meth)acrylic esters may be used in a single kind or in combination, or may be used being copolymerized with other monomers.

Other copolymers that are used being copolymerized with these monomers include styrene, vinyl toluene, acrylonitrile, methacrylonitrile, vinyl acetate, and the like.

According to the present invention, it is desired to use an acrylic resin which is chiefly constituted by a monomer of a (meth)acrylate that gives a homopolymer having Tg of 70° C. or higher. The following Table 1 shows relations between the (meth)acrylate monomers and Tg of homopolymers thereof.

TABLE 1

| Monomers | Tg (°C.) of Homopolymers |
| --- | --- |
| 2-Tert-butylphenyl acrylate | 72 |
| 2-Naphthyl acrylate | 85 |
| Methyl methacrylate | 105 |
| Isopropyl methacrylate | 81 |
| t-Butyl methacrylate | 107 |
| Cyclohexyl methacrylate | 76 |
| Phenyl methacrylate | 110 |
| Ethyl methacrylate | 65 |

Among them, a methyl methacrylate is most preferred.

The resin should contain the (meth)acrylic ester unit in an amount of 40% by weight or more and, particularly, in an amount of 50% by weight or more with respect to the resin component from the standpoint of mechanical properties.

The monomer component that gives a reactive functional group is the one having carboxyl group, hydroxyl group, epoxy group, methylol group or etherified methylol group. Concrete examples include ethylenically unsaturated carboxylic acid or anhydride thereof, acrylic acid, methacrylic acid, crotonic acid, maleic acid, fumaric acid, iraconic acid, citraconic acid, anhydrous maleic acid, anhydrous iraconic acid, and the like acids.

Examples of the hydroxyl group-containing monomer unit include vinyl alcohol, (meth)acrylic hydroxyalkyl ester and, particularly, (meth)acrylic hydroxyethyl ester, (meth)acrylic hydroxypropyl ester, and the like.

Suitable examples of the ethylenically unsaturated monomer having an epoxy group include glycidyl esters such as allyl glycidyl ether, glycidyl(meth)acrylate, methyl glycidyl methacrylate, glycidyl-p-vinylbenzoate, methyl glycidyl itaconate, glycidyl ethyl maleate, glycidyl vinyl sulfonate, glycidyl(meth)allyl sulfonate, and epoxyolefins such as butadiene monoxide, vinylcyclohexene monoxide, 2-methyl-5,6-epoxy hexene and the like.

Particularly useful monomers are allyl glycidyl ether and glycidyl(meth)acrylate.

Examples of the monomer having a methylol group or an etherified methylol group include a dimethylolated product of a (meth)acrylamide or an etherified product thereof such as an etherified product of ethyl or an etherified product of butyl.

These functional group-containing monomers may exist in the acrylic resin in the form of a random copolymer, a graft copolymer, or a block copolymer. When the polymer chains are sufficiently entangled together, they may exist in the form of homopolymers.

As mentioned already, the functional group-containing monomer component should be contained in the acrylic resin grains at such a ratio that the polar group selected from the group consisting of carboxyl group, hydroxyl group, epoxy group, methylol group and etherified methylol group is contained at a concentration of 7 to 330 millimoles per 100 g of the grains and, particularly, at a concentration of 15 to 220 millimoles per 100 g of the grains.

When the concentration of the polar groups becomes smaller than the above-mentioned range, the pot life becomes shorter than those of the plastisol compositions that lie within the above-mentioned range, and the anticreep property becomes inferior to those of the plastisol compositions that lie within the above-mentioned range, which is the most important point. When the concentration of the polar groups becomes larger than the above-mentioned range, on the other hand, the gelation property becomes inferior to those of the plastisol compositions that lie within the above-mentioned range.

It is further allowable to use a polyfunctional monomer that will be mentioned later in order to introduce crosslinking into the polymer chains.

The acrylic resin grains should have a molecular weight which is large enough to form a tough film, and should usually have a molecular weight of 100,000 or larger and, particularly, 200,000 or larger. For the applications of cap-sealing, the acrylic resin grains should have a molecular weight of 1,000,000 or larger.

Furthermore, the acrylic resin grains should have a center grain size (median diameter) of from 0.1 to 10 $\mu$m and, particularly, from 0.2 to 5 $\mu$m.

By using a value obtained by multiplying the millimols of the polar groups per 100 g of the resin by the grain size ($\mu$m), it was found that the conditions can be defined for obtaining resin grains that can be effectively used for providing a plastisol having well-balanced pot life and gelation property irrespective of the grain size. Here, a value obtained by multiplying the millimols of the carboxylic acid per 100 g of the resin by the grain size ($\mu$m) is denoted by BF. Then, the plastisol having excellent pot life and gelation property is obtained if BF of the resin grains is adjusted to lie preferably over a range of $2<BF<200$ and, more preferably, over a range of $7<BF<150$. The value BF is determined by using the millimols of the carboxylic acid per 100 g of the resin determined from the IR measurement by the diffuse reflection method under a condition in which the KBr powder and the resin powder are homogeneously mixed together at a ratio of 95:5. The diffuse reflection IR method makes it possible to selectively take out the data near the surfaces of the grains and, hence, to determine the amount of the carboxylic acid in the shell of the grains.

Preparation of the Acrylic Resin

The acrylic resin grains used in the present invention should have a single grain size which is suited for the plastisol, i.e., should have a single grain size of from 0.1 to 10 $\mu$m and, particularly, from 0.2 to 5 $\mu$m, and are obtained by the emulsion polymerization method, emulsion seed-sowing polymerization method, fine suspension polymerization method or fine suspension seed-sowing polymerization method.

Usually, a monomer is emulsified or is suspended as an oil phase in the water and is polymerized in the presence of a polymerization initiator. The aqueous medium should be used in an amount from 0.6 to 3.5 times as much by weight and, particularly, in an amount of from 0.9 to 2.5 times as much by weight as the total amount of the monomer component.

In the emulsion polymerization, the monomer is solubilized in a surfactant micelle, and the polymerization is carried out by using a water-soluble polymerization initiator. The obtained emulsion grains have sizes of usually from 0.01 to 0.2 $\mu$m, which are adjusted to a desired grain size in combination with the seed-sowing polymerization method.

It is desired that the surfactant is used in an amount of from 0.5 to 5 parts by weight per 100 parts by weight of the monomer.

The emulsion polymerization method is effective when the monomer has a low viscosity.

In the fine suspension polymerization method, the amount of the surfactant is controlled to be smaller than a critical micelle concentration, and the monomer, water, a polymerization initiator soluble in the monomer, a polymerization assistant and, as required, a suspension stabilizer are put to the homogenization treatment under the application of a large shearing force to prepare a fine suspension in which the oil phase has grain sizes of from 0.2 to 5 $\mu$m, which is then transferred to a polymerization vessel to carry out the polymerization with stirring.

The homogenization treatment is usually carried out by using a single-stage or a two-stage high-pressure pump, a homomixer, a spiral pin mixer, a colloid mill, a vibration-type stirrer or a homogenizer which uses high-pressure injection from a nozzle or an orifice or uses ultrasonic waves. The fine suspension polymerization method can be adapted even when the monomer is viscous, since fine granulation is forcibly executed under the application of a large shearing force.

It is desired that the surfactant is used usually in an amount of from 0.1 to 5 parts by weight per 100 parts by weight of the monomer component. In addition to being used for adjusting the grain size as described above, the seed-sowing polymerization method is effective in adjusting the core which is chiefly composed of a (meth)acrylic ester and for adjusting core/shell grains having a shell that contains polar groups at a high concentration. It was mentioned already that the core/shell grains prevent grains from infiltrating into the plasticizer and effectively impart excellent pot life without impairing the gelating property during the preservation of the plastisol.

By using the emulsified or finely suspension polymerized grains as seeds, the polymerization is carried out by adding the monomer, the polymerization initiator and the surfactant in suitable amounts batchwisely, in a divided manner or continuously. The polymerization is carried out while adjusting the reaction environment so that new grains will not develop during the seed-sowing polymerization. In adjusting the core/shell grains, a monomer feed method such as a power feed method or a stage feed method is employed to increase the concentration of the polar group-containing monomer in the monomer accompanying the progress of the polymerization, in order to eliminate discreteness in the polymer composition on the core/shell interface. When the polymer composition is discrete on the core/shell interface, mechanical strength of the gel and anticreep property tend to decrease which, however, holds no longer when sufficient crosslinking can be expected.

In the ordinary emulsion or fine suspension polymerization method, the core/shell grains can be easily adjusted by suitably adjusting the distribution coefficient of the polar group-containing monomer between the monomer that forms an oil phase upon the emulsion or fine suspension polymerization and the aqueous medium (water phase).

Concretely speaking, the distribution coefficient of from 0.5 to 3.0 and, particularly preferably, from 1.0 to 2.5 is effective in adjusting the core/shell grains. When the distribution coefficient exceeds the above range, the polar group-containing monomer is uniformly distributed in the polymer grains. When the distribution coefficient is smaller than the above range, the polar group-containing monomer tends to form a homopolymer in the water phase. When the distribution coefficient is within the above-mentioned range, the polar group-containing monomer gathers near the outermost nuclei of the grains, and the polymerization proceeds forming the shell portions.

When the polar group-containing monomer is dissolved in the oil phase and in the water phase maintaining equilibrium, the distribution coefficient stands for a concentration ratio of the polar group-containing monomers in these two solutions. When the concentration of the polar group-containing monomer in the oil phase is denoted by C1 and the concentration of the-polar group-containing monomer in the water phase by C2, the distribution coefficient is expressed by C1/C2. It has been known that the distribution coefficient does not usually much depend upon the concentration.

For instance, the distribution coefficient of acrylic acid into methyl methacrylate/water system is about 1.5. The core/shell grains having a shell portion of acrylic acid can be easily obtained by the emulsion or fine suspension polymerization of a mixture of methyl methacrylate and a monomer of acrylic acid.

On the other hand, the distribution coefficient of methacrylic acid into methyl methacrylate/water system is about 6.3. In this case, grains that are obtained have methacrylic acid that is uniformly distributed therein. In this case, furthermore, the seed-sowing polymerization method is usually employed for preparing the core/shell grains. It is further possible to carry out the polymerization by adding a base to the water phase or by adding a monomer to the oil phase to lower the distribution coefficient of styrene or the like into the oil phase.

Furthermore, the distribution coefficient of iraconic acid into methyl methacrylate/water system is about 0.3. In this case, the core/shell grains are prepared by carrying out the polymerization while increasing the distribution coefficient by adding an electrolytic salt or an acid to the water phase.

The core/shell grains can be prepared even by the saponification method in which grains composed chiefly of a (meth)acrylic ester are adjusted by the emulsion polymerization, emulsion seed-sowing polymerization, fine suspension polymerization or fine suspension see d-sowing polymerization, the ester is hydrolyzed in an aqueous medium by the action of an acid or a base, and carboxyl groups are introduced into the surface layer of the grains.

It is further allowable to coat the surfaces of the grains with a polar group-containing polymer by preparing the grains composed chiefly of a (meth)acrylic ester by the emulsion polymerization, emulsion seed-sowing polymerization, fine suspension polymerization or fine suspension seed-sowing polymerization, and adding a water-soluble polymer containing a polar group to an aqueous medium followed by spray drying. In this case, however, the primary grains firmly coagulate and the resulting secondary grains are not uniformly dispersed in the plasticizer. Therefore, additional labor is required for adjusting the plastisol.

As the polymerization initiator, there can be used depending upon the polymerization method azo compounds such as azoisobutylonitrile, azobismethyl isobutyrate, azobiscyclohexane carbonitrile, and azobis-2,4-dimethylvaleronitrile; hydroperoxides such as cumene hydroperoxide and t-butyl hydroperoxide; dialkyl peroxides such as di-t-butyl peroxide, dicumyl peroxide; diacyl peroxides such as benzoyl peroxide and lauroyl peroxide; peroxy esters such as t-butyl peroxypivalate, t-butylperoxylaurate and di-t-butyldiperoxyfuralate; ketone peroxides such as methyl ethyl ketone peroxide and the like; peroxydicarbonates such as diisopropylperoxy dicarbonate and the like; persulfates such as ammonium persulfate and potassium persulfate; and inorganic peroxides such as hydrogen peroxide and the like. Furthermore, the polymerization initiator of a peroxide can be used as a redox-system low-temperature initiator being used in combination with a suitable reducing agent. It is further allowable to use a combination of ionizing radiant rays such as γ-rays, accelerated electron rays or ultraviolet rays and a variety of sensitizers. The polymerization initiator should be used in an amount of from 0.01 to 3 parts by weight per 100 parts by weight of the monomer.

As the surfactants, there can be used anionic surfactants such as alkyl sulfates like laurylsodium sulfate and myristylsodium sulfate; alkylallyl sulfonate like dodecylbenzenesodium sulfonate and the like; alkylsulfosuccinates such as dioctyl sodium sulfosuccinate and dihexyl sodium sulfosuccinate; fatty acid salts such as potassium stearate and the like; alkyl phosphates; polyoxyethylene alkyl ether sulfates; and acyl sarcosine salts; as well as nonionic surfactants such as sorbitan fatty acid esters like sorbitan monolaurate and sorbitan monostearate; glycerine fatty acid esters; polyoxyethylene sorbitan fatty acid esters; polyoxyethylene alkyl ethers; polyethylene glycol fatty acid esters; and polyoxyethylene polyolxypropylene alkyl ethers, that have heretofore been known.

As the suspension stabilizers, there can be used synthetic high molecular compounds such as polyvinyl alcohol, partly saponified polyvinyl acetate, polyacrylic acid, polymethacrylic acid, polyvinyl pyrrolidone and polymethacrylamide, natural high molecular compounds such as gelatine, tragacanth gum, starch and cellulose derivatives like methyl cellulose, and inorganic fine powders which are sparingly soluble in water such as barium sulfate, calcium sulfate, barium carbonate, magnesium carbonate, calcium phosphate, talc, bentonite and the like.

Other polymerization assistants may be higher alcohols such as cetyl alcohol and lauryl alcohol; higher fatty acids or esters thereof such as lauric acid, palmitic acid and stearic acid; aromatic hydrocarbons; higher aliphatic hydrocarbons; and inorganic salts such as sodium chloride, potassium chloride, sodium sulfate and sodium bicarbonate. In order to adjust the molecular weight of the polymer, furthermore, use is made of a polymerization adjusting agent such as mercaptanes like 1-butane thiol, thiophenol, ethyl mercaptoacetate, 2-mercaptoethanol, 2-naphthalene thiol, n-dodecyl mercaptane and t-dodecyl mercaptane, disulfides such as diisopropylxanthogene disulfide and the like, and diazothio ethers.

The above-mentioned polymerization reaction is carried out under the conditions where no oxygen is present being substituted by an inert gas at a temperature of 25° to 100° C. and, particularly, at 40° to 85° C. with stirring.

Method of Rendering Acrylic Resin Grains to be Partly THF-Insoluble

In the plastisol of the present invention which is used, particularly, for sealing the caps, the acrylic resin grains should be THF-insoluble in an amount of 5 to 80% by weight and, preferably, in an amount of 10 to 60% by weight. When the insoluble moiety is smaller than 54% by weight, the molded article fails to exhibit sufficient resistance against the relaxation of stress. When the insoluble moiety exceeds 80% by weight, on the other hand, the molded article becomes hard and the cap-sealing property decreases. The following methods are used for imparting the insoluble moiety.

According to a first method, a monomer or an oligomer that causes the crosslinking reaction is made present in the polymer composition.

1. Use of a polyfunctional monomer.

Divinyl benzene, trivinyl benzene;

Monomer or oligomer having two or more acryloyl groups or methacryloyl groups at the terminals of the molecules or at the side chains, which is usually used for UV- and EB-curing acrylic paints;

Polyol polyacrylate;

Modified polyol polyacrylate;

Epoxy acrylate;

Urethane acrylate;

Polyester acrylate;

Polyfunctional allylate which is a condensation product of a polyhydric organic acid and allyl alcohol.

The acrylic resin grains having a THF-insoluble moiety are prepared by carrying out the polymerization by mixing the above-mentioned polyfunctional monomer into the acrylic monomer.

2. When a (meth)acrylate having an epoxy group is polymerized, the resin grains having a solvent-insoluble gel component are synthesized depending upon the conditions even without blending the polyfunctional vinyl. This is because the reaction takes place among the epoxy groups. When, for instance, a redox initiator is used as the polymerization initiator, it is considered that the compound used as a reducing agent promotes the ring cleavage of epoxy.

The granular composition of acrylic resin can be recovered from an emulsion prepared according to the present invention by employing an ordinary method of drying vinyl chloride resins for plastisols. Examples of the drying method include spray drying methods using a multi-vane rotary disk, a rotary disk or a nozzle, method of drying the acrylic resin composition by centrifugal dehydration through the coagulation destruction of the emulsion with inorganic salt or alcohol, and the method of directly dehydrating the emulsion by filtration. As required, furthermore, the pulverization may be effected using a hammer mill or a pin mill.

Plasticizer

As the plasticizer, use is made of esters of aromatic dibasic acid or polybasic acid such as phthalic acid and the like; esters of aliphatic dibasic acid or polybasic acid; esters of phosphoric acid; esters of hydroxy polyhydric carboxylic acid; esters of polyhydric alcohol; or epoxylated oil, that are suited for the acrylic resin.

The chief plasticizer component which is contained in an amount of 60% or more in the plasticizer should have a molecular weight of 220 to 420 and a solubility parameter (SP value) of 7.9 to 10.0. Here, the solubility parameter (SP value) is a value which is widely used for roughly evaluating the compatibility of substances. The SP value stands for one-half power of the coagulated energy density and represents the degree of hydrogen bond of substances as defined in J. Brandrup et al., Polymer Handbook, 1967, Chapter 4. The greater the degree of hydrogen bond, the greater the SP value.

As the aromatic acid constituting the plasticizer, there can be used phthalic acid and as the aliphatic carboxylic acid, there can be used adipic acid, azelaic acid or sebacic acid. As the hydroxycarboxylic acid, furthermore, there can be used glycolic acid. As the alkyl group in the ester, there is used a lower alkyl group such as ethyl, propyl or butyl. Within a range that satisfies the above-mentioned molecular weight, there can be further used a higher alkyl group such as isodecyl group, octyl group (ethylhexyl group) or an aralkyl group such as benzyl group or cresyl group.

Concrete examples include diethyl phthalate, dibutyl phthalate, butyl benzyl phthalate, acetyl tributyl citrate, butyl phthalyl butyl glycolate, dioctyl adipate, and dioctyl phthalate.

The weight ratio of the acrylic resin grains to the plasticizer should be such that sufficient fluidity is obtained during the coating and molding and that sufficient physical properties are obtained during the gelling. Generally speaking, the amount of the plasticizer should be from 50 to 120 parts by weight and, particularly, from 60 to 100 parts by weight per 100 parts by weight of the granular acrylic resin.

A plasticizer of citric ester and/or glycol ester can be particularly preferably used to accomplish the object of the present invention.

Examples of the plasticizer are as follows:

Citric esters:

Triethyl citrate, tributyl citrate, acetyltriethyl citrate, acetyltributyl citrate, acetyltri-2-ethyl hexyl citrate, acetyl-n-octyldecyl citrate, distearyl citrate, tristearyl citrate, and the like.

Glycol esters:

Ethylphthalylethyl glycolate, methylphthalylethyl glycolate, butylphthalylbutyl glycolate and the like.

Among the above plasticizers, useful examples include triethyl citrate, acetyltriethyl citrate, acetyltributyl citrate, ethylphthalylethyl glycolate and butylphthalylbutyl glycolate.

Crosslinking Agent

As the crosslinking agent made present in the plasticizer, there is used a resin component which is reactive to the functional groups in the acrylic resin and is at least partly soluble in the plasticizer. A resin having amino group, hydroxyl group or epoxy group is used for the carboxyl group of the acrylic resin, a resin having carboxyl group, epoxy group, methylol group or etherified methylol group is used for the hydroxyl group, a resin having carboxyl group, hydroxyl group, amino group, methylol group or etherified methylol group is used for the epoxy group, and a resin having carboxyl group, hydroxyl group, epoxy group, methylol group and etherified methylol group is used for the methylol group and the etherified methylol group.

As the curing resin component, there are preferably used epoxy resin, modified or unmodified polyamine, modified or unmodified polyamideamine and methylolated or ether methylolated amino resin. They may be used alone or in a combination of a plurality of kinds. Or they may be used in combination with other curing assistant and curing catalyst.

The epoxy resin should have two or more epoxy groups in the molecule. Suitable examples are as described below. Bisphenol A-type epoxy resins include those shown in the following Table 2.

TABLE 2

|  | Epoxy equivalent (EEW) | Number average molecular weight (Mn) |
| --- | --- | --- |
| Epikote 828 | 185 | 355 |
| Epikote 834 | 250 | 470 |
| Epikote 1001 | 500 | 1000 |
| Epikote 1004 | 900 | 1400 |
| Epikote 1007 | 2000 | 2900 |
| Epikote 1009 | 3000 | 3750 |
| Epikote 1010 | — | 5100 |

Bisphenol F-type epoxy resins include those shown in the following Table 3.

TABLE 3

|  | Epoxy equivalent (EEW) | Number average molecular weight (Mn) |
| --- | --- | --- |
| Epikote 806 | 170 | — |
| Epikote 4000P | — | 930 |
| Epikote 4004P | — | 1630 |
| Epikote 4007P | — | 3170 |
| Epikote 4009P | — | — |
| Epikote 4010P | — | 4650 |

Epikotes used were epoxy resins manufactured by Yuka Shell Epoxy Co., which, however, are in no way limited to the above-mentioned ones.

Among the above-mentioned epoxy resins, those which are useful for the present invention are liquid epoxy resins having low molecular weights and having number average molecular weights of from 250 to 1000 and, particularly, from 300 to 700.

As the modified polyamine, there can be used aliphatic, alicyclic or aromatic compound having many primary, secondary or tertiary amino groups in the molecules satisfying the above-mentioned conditions. Examples include polyalkylene polyamine, polyethyleneimine, polyvinylamine, or product's thereof modified with fatty acid, rosin, phenolic resin, or epoxy resin. A modified product is preferred from the standpoint of solubility in the plasticizer.

As the modified polyamideamine, there is used a low molecular aliphatic polyamide having many primary, secondary or tertiary amino groups in the molecule, such as a reaction product of a fatty acid dimer (dimer acid) and diamines or the polyamine. There can be further used a product thereof modified with fatty acid, rosin, phenolic resin or epoxy resin. A modified product is desired from the standpoint of solubility in the plasticizer.

As the methylolated or ether methylolated amino resin, there can be exemplified urea resin, melamine resin and benzoguanamine resin having many methylol groups in the molecule. The ether resins are obtained by etherifying methylol group of the above-mentioned resins with alcohols such as ethanol or butanol.

The weight ratio of the acrylic resin grains to the crosslinking agent varies depending upon the concentration of the functional groups that participate in the crosslinking reaction but should generally be such that the amount of the crosslinking agent is from 1 to 30 parts by weight and, particularly, from 2 to 20 parts by weight per 100 parts by weight of the acrylic resin grains. When the amount of the crosslinking agent becomes smaller than the above range, the degree of crosslinking of the acrylic resin grains so decreases that the anticreep property is not obtained to a sufficient degree. When the amount of the crosslinking agent becomes greater than the above range, on the other hand, the fluidity decreases during the coating and molding, or the hardness of the gelled product becomes so high that the cushioning property and softness are lost.

According to a preferred embodiment of the present invention, the bisphenol A-type and/or the bisphenol F-type epoxy resins are used in an amount of from 0.1 to 10 parts by weight and, particularly, in an amount of from 0.3 to 10 parts by weight per 100 parts by weight of the acrylic resin grains, and the epoxy curing resin such as methylolated or ether methylolated amino group, modified or unmodified polyamine, or modified or unmodified polyamideamine is blended in an amount of from 0.1 to 15 parts by weight and, preferably, from to 10 parts by weight per 100 parts by weight of the acrylic resin grains, in order to obtain resistance against the relaxation of stress and sufficiently high cushioning property.

The plastisol may be blended with any widely known blending agents such as filler, coloring agent, thermal stabilizer, foaming agent, antioxidizing agent, viscosity-increasing agent, viscosity-decreasing agent and oxygen-absorbing agent according to any known recipe.

Applications

The acrylic resin plastisol composition of the present invention has excellent pot life and excellent gelation property, enabling the obtained coating or the molded article to exhibit excellent anticreep property. Accordingly, the acrylic resin plastisol composition of the invention can be used for a variety of applications for which the PVC plastisol has heretofore been widely used, such as packings or gaskets, interior ornamental products, toys, articles for daily use, miscellaneous goods, various coatings, various packings, formation or coating of films and sheets.

The molding is carried out by using such means as slush molding, rotary molding, pour molding or dip molding. The coating is carried out by employing spread method, dipping method, spin-coating method, gravure-coating method, spray coating method or screen-coating method. The acrylic resin plastisol of the present invention is particularly useful for forming, relying upon the spin-coating method, the gaskets or liners for sealing various containers and container closures.

The acrylic resin plastisol composition of the present invention should usually have a viscosity of from 0.5 to 1000 poises at room temperature from the standpoint of workability at the time of coating and molding, and should have a hardness (JIS-A) during the gelling of from 15 to 75 when it is used for forming the sealing gaskets and liners as described above though the hardness may vary depending upon the applications.

The plastisol can be easily cured by the heating at a temperature of from 100° to 230° C.

EXAMPLES

The invention will now be described in detail by way of Working Examples.

Measurements in Working Examples were taken as described below.

Evaluation of Pot Life

The pot life of the plastisol was evaluated by measuring the viscosity with the passage of time. The plastisol was preserved at 25° C. and the viscosity was measured by using a Brookfield viscometer, No. 4 rotor, under the conditions of 6 rpm at 25° C. The grains in the plastisol may often be soft-coagulated exhibiting apparently increased viscosity. Therefore, the sample was stirred before measuring the viscosity.

The number of days of preservation when the viscosity exceeded 1000 poises was used as an indication of pot life. To prepare a practically useful plastisol, it is desired that the pot life is longer than 20 days. The viscosity was measured up to four weeks, and pot lifes of the plastisols of which the viscosities are smaller than 1000 poises even after four weeks have passed were expressed as >28.

Gelation Property

The acrylic plastisol composition was weighed in a predetermined amount onto an aluminum pan and was heat-treated under the conditions of 220° C. for 90 seconds to evaluate the state of the gelled sheet. The gelation property was expressed as follows: ◯ when there was obtained a soft and tough gelled sheet, Δ when there was obtained a soft sheet but having a slightly decreased strength, and ✕ when soft sheet was not obtained.

Testing the Anticreep Property

The anticreep property was evaluated by measuring the relaxation of stress. The relaxation of stress and creep property establish a conflicting relationship relative to each other, and, hence, the anticreep property of the sample is easily evaluated from the behavior of relaxation of stress. Concretely speaking, a sample having a width of 7 mm and a thickness of about 1 mm was prepared, and was held between two chucks arranged up and down maintaining a gap of 20 mm. Then, tensile distortion of 50% was instantaneously applied thereto, and the mode in which the stress undergoes relaxation with the passage of time from the moment when distortion was applied to the sample was observed. The temperature of the atmosphere in which the sample was placed was controlled, and the measurement was taken for about one hour at a temperature of 120° C.

Stress 0.1 seconds after the application of distortion was regarded as initial stress $\sigma_0$ and stress after a time t has passed was denoted as $\sigma_t$, and the time t in which $\sigma_t/\sigma_0 (=0.368)$ was regarded to be a relaxation time. In order to provide sealing gaskets that can be used as gaskets and liners without developing creep deformation during the use but maintaining excellent sealing property for extended periods of time yet meeting the demand for heat resistance, the relaxation time at 120° C. must be at least 10 minutes or longer. For the applications where resistance against retorting is required, the relaxation time against stress must be one hour or longer. The plastisol composition is not utilizable as sealing gaskets if it breaks during the measurement at 120° C. for one hour.

In Examples, the gelled sheets were prepared under the heating conditions of 220° C. for 90 seconds and were tested for their anticreep property unless otherwise stated.

Testing the Sealing Property

A shell for white cap having an outer diameter of 66 mm was lined with the acrylic plastisol and was heat-treated at 220° C. for 90 seconds to form a liner having a thickness of 1.3 mm at the deepest portion. A glass bottle having a content of 185 cc was filled with hot water of 90° C. such that the head space was 10 cc, and was sealed with the white cap that had been heated in advance with steam under a predetermined tightening condition that imparted 40% of compressive distortion to the liner. Then, a hot-pack testing sample that was left to cool, a hot water-sterilized testing sample treated in the hot water of 90° C. for 30 minutes, and a retort testing sample retort-treated at 120° C. for 30 minutes, were prepared to evaluate the sealing property. The retort-treatment was carried out by using a retort-processing apparatus of the pressure cooling type, the retort being placed upright and stored without loading up, under the application of a cooling pressure of 1.8 kgf/cm².

The sealing property was evaluated by measuring the degree of pressure reduction of the sample at room temperature using a vacuum gauge and by visually observing the liner portion after the cap was removed. The caps that exhibited good sealing property immediately after the heat-treatment were inspected for one month. The caps having poor condition in the liner included those in which a portion contacting to the mouth of the bottle had been creep-fluidized to such a degree that the metal surface of the cap could be seen through, and those in which the liner had been completely broken along the mouth of the bottle permitting the metal surface of the cap to be exposed. The former defect is expressed as creep and the latter defect is expressed as cut through.

THF-Insoluble Moiety

The acrylic resin powder of a weight of $W_1$ was taken into the Erlenmeyer flask, and the THF-soluble moity was extracted in the THF with stirring overnight at room temperature. Then, the solid-liquid separation was effected using a centrifuge. After the supernatant solution was removed, THF was added to wash the THF-insoluble moiety. The solid-liquid separation was effected again, the supernatant solution was removed, the whole amount of the THF-insoluble moiety was transferred to a container of which the weight has been known and was sufficiently dried using a vacuum drying apparatus and, then, the weight $W_2$ of the THF-insoluble moiety was weighed. The THF-insoluble moiety was calculated in compliance with 100 $W_2/W_1$ % by weight.

Measurement of IR

Whether the core/shell grains were formed or not was determined by measuring IR. The acrylic resin powder and the KBr powder were mixed together at a ratio of 5:95, and the mixture was pulverized using a pulverizer to obtain a uniformly dispersed state. The mixture was then equally divided into two. One was molded under the application of pressure to prepare KBr tablets to measure the transmission spectra thereof. The other one was left in the form of the powder and was measured for its diffuse reflection spectra by the diffuse reflection method. In the diffuse reflection method, the data are selectively obtained from near the surface layer of the sample grains, and the measurement of transmission helps obtain bulk analysis. Comparison of the two spectra makes it possible to easily judge whether the grains have a core/shell structure or a uniform structure.

Measurement of Grain Size

The grain size was measured by using an emulsion after the acrylic resin grains were polymerized in the water. The median diameter found by using a centrifugal sedimentation-type grading analyzer was regarded to be an average grain size.

Measurement of Molecular Weight

The molecular weight of the acrylic resin was found by the GPC (gel permeation chromatography). By using the THF as a solvent and using a calibration curve obtained from a standard polystyrene sample of which the molecular weight has been known, the number average molecular weight that was obtained was regarded to be an average molecular weight.

Example 1

95 Parts by weight of a methyl methacrylate monomer (MMA), 5 parts by weight of an acrylic acid (AA), 0.2 parts by weight of a t-butylperoxypivalate, 2.3 parts by weight of a lauryl alcohol, 1 part by weight of a laurylsodium sulfuric acid ester, and 122 parts by weight of the water were fed into a stainless steel premixing tank equipped with a stirrer. After degasification and substitution with nitrogen were repeated, the mixture was stirred at room temperature for 20 minutes to form liquid droples of a monomer composition.

The mixture was then passed through a pressurized homogenizer to form fine liquid droplets of the monomer composition having a uniform diameter, and was then introduced into a degasified stainless steel autocrave equipped with a stirrer. The mixture was heated at 60° C. with stirring and was maintained at this temperature for 5 hours to complete the reaction. The mixture was then spray-dried to prepare an acrylic resin powder.

The acrylic resin powder polymerized here possessed a grain size of 1.5 μm and a molecular weight of 1,600,000. From the transmission in the IR measurement and from the comparison of the diffuse reflection spectra, it was confirmed that the core/shell grains had been composed of a shell of chiefly AA and a core of chiefly MMA.

100 Parts by weight of the above-mentioned acrylic resin powder, 80 parts by weight of an acetyltributyl citrate (ATBC), 4 parts by weight of an Epikote 828 (bisphenol A-type epoxy resin produced by Yuka Shell Epoxy Co.), 3.5 parts by weight of Cymel 303 (melamine resin prduced by Mitsui Cyanamide Co.) and 0.2 parts by weight of Catalyst 600 (aromatic sulfonic acid catalyst produced by Mitsui Cyanamide Co.) were fed into the pulverizer, kneaded together for 20 minutes, and were defoamed in vacuum for 10 minutes to prepare a paste-like acrylic plastisol.

In this Example, use was made of a crosslinking agent that completely dissolved in the ATBC that was the plasticizer.

The acrylic plastisol prepared here exhibited a pot life of longer than four weeks, and from which a soft and tough gelled sheet was formed through the heating at 220° C. for 90 seconds. In the anticreep testing, a relaxation time of 43 minutes was exhibited, and no sample broke during the measuring time of one hour. In testing the sealing, favorable results were obtained in the hotpack and hot water-sterilization testing, and there was no problem in regard to the degree of pressure reduction and the state of the liner even after the trace examination of one month. In the retort testing, however, development of cut through was recognized when the cap was removed just after the retorting.

From the above results of testings, the acrylic plastisol of the Example was useful as a composition for cap-sealing in such fields as hot-pack and hot water-sterilization.

Comparative Example 1

An MMA homopolymer powder was prepared in the same manner as in Example 1 and, then, an acrylic plastisol was prepared from 100 parts by weight of an MMA powder, 80 parts by weight of the ATBC, 4 parts by weight of the Epikote 828, 3.5 parts by weight of the Cymel 303, and 0.2 parts by weight of the Catalyst 600.

The MMA powder polymerized here possessed a grain size of 1.3 μm and a molecular weight of 1,500,000.

The acrylic plastisol prepared here exhibited viscosity that suddenly increased immediately after it was prepared and completely turned into gel after one week has passed. The pot life was as short as about two days. As for the gelation property, a soft and tough gelled sheet was obtained but a relaxation time was 5 minutes in the anticreep testing, and breakage in the sample was observed in 8 minutes. In the testing of sealing, good sealing property was obtained immediately after the hot-pack testing, but creep had been place to a considerable degree when the cap was removed after one month.

When there exists no functional group in the acrylic resin grains as in this Comparative Example, the pot life and anticreep property are both insufficient, and practically useful plastisol composition is not obtained.

Comparative Example 2

The acrylic plastisol was prepared in the same manner as in Example 1 using 100 parts by weight of the acrylic resin powder (MMA/AA copolymer) and 80 parts by weight of the ATBC used in Example 1.

The plastisol of this Comparative Example exhibited a pot life of longer than four weeks, and from which a soft and tough gelled sheet was obtined exhibiting good gelation property. However, the relaxation time was four minutes, breakage in the sample was observed about 4 minutes after the measurement, and the anticreep property was inferior. In the testing of sealing, the results were the same as those of Comparative Example 1. Even in the hot-pack testing, the sealing property could not be guaranteed for extended periods of time.

When no crosslinking agent is used as in this Comparative Example, a plastisol composition having practically useful anticreep property is not obtained despite the acrylic resin grains have a functional group.

Comparative Example 3

In Comparative Example 3, the curing agent components used in Example 1 were changed.

80 Parts by weight of the ATBC as a plasticizer, 4 parts by weight of the Epikote 828 and 3.5 parts by weight of a 4-methylolated bisphenol A as crosslinking agents were preliminarily mixed together using a pulverizer, and were then blended with 100 parts by weight of the acrylic resin powder (MMA/AA copolymer) that was used in Example 1 to prepare an acrylic plastisol. Due to the preliminary mixing of the 4-methylolated bisphenol A and ATBC, the liquid became turbid in white color, a dispersion of the 4- methylolated bisphenol A was formed, and it was confirmed that the 4-methylolated bisphenol A and the ATBC were not compatible with each other.

During the testing of the anticreep property and sealing property, the sample suddenly broke during the measurement of relaxation of stress after 5 minutes from the beginning of the measurement. Even in the testing of sealing property, the results were the same as those of Comparative Examples 1 and 2. In the hot-pack testing, it was found that the sealing property could not be guaranteed for extended periods of time.

As a result, it was found that when the crosslinking agent and the plasticizer were not compatible with each other, the crosslinking reaction did not proceed homogeneously and the effect of the crosslinking agent that was blended was not exhibited.

Example 2

In Example 2, the crosslinking agent components of Example 1 were changed.

80 Parts by weight of the ATBC as a plasticizer, and 4 parts by weight of the Epikote 828, 2 parts by weight of Adekahardener 6302 and 0.5 parts by weight of Adekahardener EH252 were preliminarily mixed together and were then blended with 100 parts by weight of the acrylic resin powder (MMA/AA copolymer) of Example 1 to prepare an acrylic plastisol. The Adekahardener is a crosslinking agent produced by Asahi Denka Co., and 6302 is a modified polyamideamine and EH 252 is a modified aliphatic polyamine. The Adekahardener 6302 did not completely dissolve in the ATBC but the color-less and transparent ATBC were considerably colored in a reddish yellow color due to the crosslinking agent, from it was confirmed that the crosslinking agent had been partly solubilized in the plasticizer.

The thus prepared acrylic plastisol exhibited a slightly large viscosity but its pot life was longer than four weeks, and from which a soft and tough gelled sheet could be obtained through the heating at 220° C. for 90 seconds. In the testing of anticreep property, a relaxation time of 41 minutes was exhibited and no breakage in the sample was observed. In testing the sealing property, the sheet withstood the hot-pack and hot water-sterilization testing like that of Example 1, and there aroused no problem even after the trace examination of one month. In the retort testing, however, development of cut through was confirmed when the cap was removed immediately after the retorting.

From the above results of testings, the acrylic plastisol of the Example was useful as a composition for cap-sealing in such fields as hot-pack and hot water-sterilization.

Example 3

An emultion of the acrylic resin grains was prepared and, then, an acrylic resin powder was prepared from a monomer mixture of 95 parts by weight of the MMA, 4.8 parts by weight of the AA, and 0.2 parts by weight of a divinyl benzene (DVB) in the same manner as in Example 1.

The acrylic resin grains prepared here possessed a grain size of 1.6 $\mu$m and a molecular weight of 2,000,000 or larger. It was confirmed through the measurement of THF-insoluble moiety that the acrylic resin grains possessed 24.1% of a gel component and through the IR measurement that the grains possessed a core/shell structure consisting of an AA-rich shell and a core of MMA.

80 Parts by weight of a butylbenzyl phthalate (BBP), 4 parts by weight of an Epikote 806 (bisphenol F-type epoxy resin produced by Yuka Shell Epoxy Co.), 4 parts by weight of the Cymel 303 and 0.2 parts by weight of the Catalyst 600 were preliminarily mixed together using a pulverizer, and to which was gradually added 100 parts by weight of the acrylic resin powder prepared above, followed by pulverization for 20 minutes and defoaming in vacuum for 10 minutes to prepare an acrylic plastisol.

The acrylic plastisol of this Example exhibited a pot life of longer than four weeks from which a soft and tough gelled sheet could be obtained through the heating at 220° C. for 90 seconds. In the testing of anticreep property, a relaxation time of longer than one hour was exhibited, and no breakage in the sample was observed. In testing the sealing property, the acrylic plastisol withstood the retort processing as well as the hot-pack and hot water-sterilization testing, and exhibited excellent sealing property even after the trace examination of one month. From the above results of testings, the acrylic plastisol of the Example was useful as a composition for cap-sealing in such fields as hot-pack, hot water-sterilization and retort processing.

Example 4

An emulsion of acrylic resin grains was prepared and, then, an acrylic resin powder was prepared from a monomer mixture of 95 parts by weight of the MMA and 5 parts by weight of a glycidyl methacrylate (GMA) in the same manner as in Example 1.

The; acrylic resin grains prepared here possessed a grain size of 1.8 $\mu$m and a molecular weight of 1,800,000. It was confirmed through the measurement of THF-insoluble moiety that the acrylic resin grains possessed 12.5% of a gel component. It was confirmed through the IR measurement that the GMA concentration in the diffused reflection spectrum was slightly higher than thee GMA concentration in the transmission spectrum, which, however, did not appear as a distinct difference.

80 Parts by Weight of the ATBC, 4 parts by weight of an Epikote 828, 3 parts by weight of the Cymel 303, 0.2 parts by weight of the Catalyst 600 and 3 parts by weight of TiO$_2$ were preliminarily mixed together using a pulverizer, and to which was gradually added 100 parts by weight of the acrylic resin powder prepared above, followed by pulverization for 20 minutes and defoaming in vacuum for 10 minutes to prepare an acrylic plastisol.

The acrylic resin grains of this Example did not possess a distinct core/shell structure, but exhibited a particularly stabilized viscosity owing to the use of the ATBC. The acrylic plastisol of this Example possessed a pot life of longer than four weeks and, particularly, longer than two months. A soft and tough gelled sheet was obtained through the heating at 220° C. for 90 seconds. In the testing of anticreep property, a relaxation time of longer than one hour was exhibited, and no breakage in the sample was observed. In testing the sealing property, the acrylic plastisol withstood the retort processing as well as the hot-pack and hot water-sterilization testing, and exhibited excellent sealing property even after the trace examination of one month.

From the above results of testings, the acrylic plastisol of the Example was useful as a composition for cap-sealing in such fields as hot-pack, hot water-sterilization and retort processing.

When the acrylic resin powder of Example 4 was used in combination with a plasticizer of phthalic ester such as BBP, the pot life was shorter than 20 days, and practicable plastisol composition was not obtained.

Example 5

An emulsion of acrylic resin grains was prepared and, then, an acrylic resin powder was prepared from a monomer mixture of 95 parts by weight of the MMA, 5 parts by weight of the GMA, 1 part by weight of the AA, and 0.2 parts by weight of an ethyleneglycol dimethacrylate (EGDMA) in the same manner as in Example 1.

The acrylic resin grains prepared here possessed a grain size of 1.5 μm and a molecular weight of 2,000,000 or larger. It was confirmed through the measurement of THF-insoluble moiety that the acrylic resin grains possessed 38.1% of a gel component. It was confirmed through the IR measurement that the grains possessed a core/shell structure having AA concentrated in the surface layer of the grains.

80 Parts by weight of the butylbenzyl phthalate (BBP), 4 parts by weight of an Epikote 806, 4 parts by weight of the Cymel 303, and 0.2 parts by weight of the Catalyst 600 were preliminarily mixed together using a pulverizer, and to which was gradually added 100 parts by weight of the acrylic resin powder prepared above, followed by pulverization for 20 minutes and defoaming in vacuum for 10 minutes to prepare an acrylic plastisol.

The acrylic resin grains of this Example possessed a pot life of longer than four weeks, from which a soft and tough gelled sheet was obtained through the heating at 220° C. for 90 seconds. In the testing of anticreep property, a relaxation time of longer than one hour was exhibited, and no breakage in the sample was observed. In testing the sealing property, the acrylic-plastisol withstood the retort processing as well as the hot-pack and hot water-sterilization testing, and exhibited excellent sealing property even after the trace examination of one month. The acrylic plastisol of this Example withstood the retort testing of as strict as the cooling pressure of 2.4 kgf/cm$^2$ and exhibited excellent sealing property. This proves that the liner withstood even a large compressive load during the retort processing.

From the above results of testings, the acrylic plastisol of the Example was useful as a composition for cap-sealing in such fields as hot-pack, hot water-sterilization and retort processing.

Examples 6 to 13 and Comparative Examples 4 to 11

In Examples 6 to 13 and Comparative Examples 4 to 11, plastisol compositions were prepared by changing the acrylic resin grains, plasticizers and crosslinking agents to evaluate pot life, gelation property, anticreep property and sealing property. Table X shows details of the resins, plasticizers and crosslinking agents used in Examples and Comparative Examples, and the results of evaluation related to the pot life and the gelation property.

The plastisols exhibiting excellent pot life and gelation property were further tested for their anticreep property and sealing property. Table Y shows the results of evaluation.

| (Description of Symbols) | |
|---|---|
| Monomers: | |
| MMA | methyl methacrylate |
| EMA | ethyl methacrylate |
| iPMA | isopropyl methacrylate |
| tBMA | tertiary butyl methacrylate |
| CHMA | cyclohexyl methacrylate |
| PhMA | phenyl methacrylate |
| EA | ethyl acrylate |
| BA | butyl acrylate |
| EHA | ethyl hexyl acrylate |
| ST | styrene |
| MST | α-methyl styrene |
| VAc | vinyl acetate |
| DVB | divinyl benzene |
| TVB | trivinyl benzene |
| EGDMA | ethyleneglycol dimethacrylate |
| DEGDMA | diethyleneglycol dimethaerylate |
| PGDMA | propyleneglycol dimethacrylate |
| GMA | glycidyl methacrylate |
| GA | glycidyl acrylate |
| AIGE | allylglycidyl ether |
| MAA | methacrylic acid |
| AA | acrylic acid |
| HEA | hydroxyethyl acrylate |
| HEMA | hydroxyethyl methacrylate |
| MAAM | N-methylolacrylamide |
| BAAM | N-butoxymethylacrylamide |
| Plasticizers: | |
| ATBC | acetyltributyl citrate |
| ATEC | acetyltriethyl citrate |
| BPBG | butylphthalylbutyl glycolate |
| EPEG | ethylphthalylethyl glycolate |
| DBP | dibutyl phthalate |
| DOP | 2-ethyl hexyl phthalate |
| DIDP | isodecyl phthalate |
| BBP | butylbenzyl phthalate |
| DOS | dioctyl sebacate |
| DOA | dioctyl adipate |
| ESO | epoxylated soybeam oil |
| TCP | tricresyl phosphate |
| (Epoxy resins and crosslinking agents) | |
| E806 | bisphenol F-type epoxy resin produced by Yuka Shell Epoxy Co. |
| E828 | bisphenol A-type epoxy resin produced by Yuka Shell Epoxy Co. |
| E834 | same as above |
| C303 | melamine resin produced by Mitsui Cyanamide Co. |
| C325 | same as above |
| C370 | same as above |
| C1123 | benzoguanamine resin produced by Mitsui Cyanamide Co. |
| EH203 | polyamideamine resin produced by Ashi Denka Co. |
| EH331 | same as above |

TABLE X

| | Acrylic resin composition (% by weight) | | Gain structure | Molecular weight | Grain size (μm) | THF-insoluble moiety |
|---|---|---|---|---|---|---|
| | Reactive monomer | Inert monomer | | | | |
| Example | | | | | | |
| 6 | MAA(5) | MMA(65)ST(30) | core/shell | 1,700,000 | 1.3 | 5% or less |
| 7 | AA(5) | MMA(75)BA(20) | core/shell | 1,500,000 | 1.0 | 5% or less |
| 8 | AA(3)GA(5) | MMA(82)EA(10) | core/shell | 2,000,000 | 1.8 | 16.8% |
| 9 | AA(2) | MMA(97.7)EGDMA(0.3) | core/shell | 2,000,000 | 2.0 | 35.3% |
| 10 | AA(4)MAA(5) | MMA(77)EHA(15) | core/shell | 1,200,000 | 0.8 | 5% or less |
| 11 | AA(2)MAAM(5) | MMA(92.8)EGDMA(0.1) | core/shell | 2,000,000 | 1.6 | 24.6% |
| 12 | AA(1)HEMA(5) | MMA(93.9)EGDMA(0.1) | core/shell | 2,000,000 | 1.5 | 11.9% |

TABLE X-continued

| | | | | | | |
|---|---|---|---|---|---|---|
| 13 Comp. Example | AA(1)BAAM(5) | MMA(93.9)EGDMA(0.1) | core/shell | 2,000,000 | 1.5 | 18.4% |
| 4 | MAA(5) | MMA(95) | uniform | 1,800,000 | 1.5 | 5% or less |
| 5 | MAA(29) | MMA(71) | uniform | 1,600,000 | 1.3 | 5% or less |
| 6 | AA(5) | MMA(75)BA(20) | core/shell | 1,500,000 | 1.0 | 5% or less |
| 7 | AA(5) | MMA(75)BA(20) | core/shell | 1,500,000 | 1.0 | 5% or less |
| 8 | AA(5) | MMA(95) | core/shell | 1,600,000 | 1.5 | 5% or less |
| 9 | AA(5) | MMA(95) | core/shell | 1,600,000 | 1.5 | 5% or less |
| 10 | AA(5) | MMA(95) | core/shell | 1,600,000 | 1.5 | 5% or less |
| 11 | AA(5) | MMA(95) | core/shell | 1,600,000 | 1.5 | 5% or less |

| | Plasticizer | Type and composition of crosslinking agent (% by weight) | Plastisol composition resin plasticizer/ crosslinking agent | Pot life | Gelation property |
|---|---|---|---|---|---|
| Example | | | | | |
| 5 | ATBC | E834(57)/C303(43) | 100/85/7 | >28 | ○ |
| 7 | DOP | E806(57)/C303(43) | 100/80/7 | >28 | ○ |
| 8 | BPBG | E828(57)/C325(43) | 100/80/7 | >28 | ○ |
| 9 | ATBC | E828(60)/C303(40) | 100/80/5 | >28 | ○ |
| 10 | DBP | E828(57)/C303(43) | 100/70/12 | >28 | ○ |
| 11 | ATBC | E828(60)/C325(40) | 100/90/3 | >28 | ○ |
| 12 | ATBC | E828(57)/C303(43) | 100/80/7 | >28 | ○ |
| 13 | ATBC | E828(60)/C303(43) | 100/80/7 | >28 | ○ |
| Comp. Example | | | | | |
| 4 | ATBC | E828(57)/C303(43) | 100/80/7 | <20 | ○ |
| 5 | BPBG | E828(57)/C303(43) | 100/80/7 | >28 | X |
| 6 | DIDP | E828(57)/C303(43) | 100/80/7 | >28 | X |
| 7 | ESO | E828(57)/C303(43) | 100/80/7 | >28 | X |
| 8 | ATBC | E828(57)/C303(43) | 100/120/7 | >28 | X |
| 9 | ATBC | E828(57)/C303(43) | 100/50/7 | <20 | X |
| 10 | ATBC | E828(57)/C303(43) | 100/80/30 | >28 | X |
| 11 | ATBC | E828(90)/C303(10) | 100/80/1 | >28 | ○ |

TABLE Y

Evaluation of anticreep property and sealing property of Examples 6-13 and Comparative Example 11

| | Anticreep property | | Sealing property | | |
|---|---|---|---|---|---|
| | Relaxation time | Broken sample | Hot-pack | Hot water sterilization | Retor |
| Example 6 | 46 min. | none | ○ | ○ | X |
| Example 7 | 38 min. | none | ○ | ○ | X |
| Example 8 | 1 hr or longer | none | ○ | ○ | ○ |
| Example 9 | 1 hr or longer | none | ○ | ○ | ○ |
| Example 10 | 35 min. | none | ○ | ○ | X |
| Example 11 | 1 hr or longer | none | ○ | ○ | ○ |
| Example 12 | 1 hr or longer | none | ○ | ○ | ○ |
| Example 13 | 1 hr or longer | none | ○ | ○ | ○ |
| Comparative Example 11 | 8 min. | 8 min. | X | X | X |

We claim:

1. An acrylic plastisol composition having excellent anticreep property comprising:
   (A) a dispersing medium composed chiefly of a plasticizer,
   (B) acrylic resin particles dispersed in said dispersing medium, and
   (C) a crosslinking agent, wherein said acrylic resin particles are obtained by copolymerization of a monomer composition comprising
      (i) at least 40% by weight, based on the weight of the resin, of at least one ester of an acrylic acid or methacrylic acid or a combination of said ester and a comonomer selected from the group consisting of styrene, vinyltoluene, acrylonitrile, methacrylonitrile, and vinyl acetate, and
      (ii) a functional monomer having a reactive functional group selected from the group consisting of a carboxyl group, a hydroxyl group, an epoxy group, a methylol group and an etherified methylol group, said reactive functional group being present at a concentration of 7 to 330 mmoles per 100 g of the particles, said acrylic resin particles having a number average molecular weight of at least 200,000 and said crosslinking agent is a resin which is reactive with the functional groups in the acrylic resin and is at least partly soluble in the plasticizer, said acrylic plastisol composition having a relaxation time of stress of at least 10 minutes at a temperature of 120° C. in a gelled state.

2. An acrylic plastisol composition having excellent anticreep property comprising a dispersing medium composed chiefly of a plasticizer and acrylic resin particles dispersed in said dispersing medium, wherein said acrylic resin particles have a functional group selected from the group consisting of carboxyl group, hydroxyl group, epoxy group, methylol group and etherified methylol group, and have 10 to 60% by weight of a tetrahydrofuran (THF) insoluble moiety and said dispersing medium contains a crosslinking agent that is reactive with said functional group in a state of being at least partly solubilized in said dispersing medium.

3. An acrylic plastisol composition having excellent anticreep property comprising:
   (A) a dispersing medium composed chiefly of a plasticizer,
   (B) acrylic resin particles dispersed in said dispersing medium, and
   (C) a crosslinking agent, wherein said acrylic resin particles are obtained by copolymerization of a monomer composition comprising
      (i) at least 40% by weight, based on the weight of the resin, of at least one ester of an acrylic acid or methacrylic acid or a combination of said ester and a comonomer selected from the group consisting of styrene, vinyltoluene, acrylonitrile, methacrylonitrile and vinyl acetate, and (ii) a functional monomer having a reactive functional group selected from the group consisting of a carboxyl group, a hydroxyl group, an epoxy group, a methylol group, and an etherified methylol group, said reactive functional group being present at a concentration of 7 to 330 mmoles per 100 g of the particles, and (iii) a poly-functional monomer selected from the group consisting of divinyl benzene, trivinyl benzene, monomer or oligomer having two or more acryloyl groups or methacryloyl groups, polyol polyacrylate, modified polyol polyacrylate, epoxy acrylate, urethane acrylate, polyester acrylate and a condensation product of a polyhydric organic acid and allyl alcohol, said acrylic resin particles having a number average molecular weight of at least 200,000, and a tetrahydrofuran (THF) insoluble moiety of 10 to 60% by weight, said crosslinking agent is a resin which is reactive with the functional groups in the acrylic resin and is at least partly soluble in the plasticizer, said acrylic plastisol composition having a relaxation time of stress of at least 10 minutes at a temperature of 120° C. in a gelled state.

4. A plastisol composition according to claims 1, 2 or 3, wherein said acrylic resin grains contain the functional groups at a concentration of 7 to 330 millimoles per 100 g of the grains thereof.

5. A plastisol composition according to claim 1, 2 or 3, wherein said acrylic resin grains comprise a core of a resin component composed chiefly of a (meth)acrylic ester unit and a shell of an acrylic resin component having a functional group-containing monomer unit.

6. A plastisol composition according to claim 1, 2 or 3, wherein said crosslinking agent is a liquid epoxy compound, a modified or unmodified polyamine, a modified or unmodified polyamideamine, or a methylolated or ether methylolated amino resin.

7. A plastisol composition according to claim 1, 2 or 3, wherein a chief plasticizer component which is contained in an amount of 60% or more in the plasticizer has a molecular weight of 220 to 420 and a solubility parameter (SP value) of 7.9 to 10.0.

8. A plastisol composition according to claim 1, 2 or 3, wherein the crosslinking agent is contained in an amount of from 1 to 30 parts by weight and the plasticizer is contained in an amount of from 50 to 120 parts by weight per 100 parts by weight of the acrylic resin grains.

9. A plastisol composition according to claim 1, wherein the plasticizer is a citric ester plasticizer and/or a glycol ester plasticizer.

* * * * *